United States Patent
Croix (10) Patent No.: US 7,194,716 B2
(45) Date of Patent: Mar. 20, 2007

(54) APPARATUS AND METHODS FOR CELL MODELS FOR TIMING AND POWER ANALYSIS

(75) Inventor: John F. Croix, Austin, TX (US)

(73) Assignee: Nascentric, Inc., Austin, TX (US)

( * ) Notice: Subject to any disclaimer, the term of this patent is extended or adjusted under 35 U.S.C. 154(b) by 210 days.

(21) Appl. No.: 10/839,787

(22) Filed: Apr. 28, 2004

(65) Prior Publication Data

US 2004/0243952 A1 Dec. 2, 2004

Related U.S. Application Data

(63) Continuation-in-part of application No. 10/465,518, filed on Jun. 19, 2003.

(60) Provisional application No. 60/466,295, filed on Apr. 29, 2003, provisional application No. 60/389,997, filed on Jun. 19, 2002.

(51) Int. Cl.
*G06F 17/50* (2006.01)

(52) U.S. Cl. .......................... 716/6; 703/14

(58) Field of Classification Search ................ 716/10, 716/4; 703/13–14, 3, 4, 5, 20–22, 19
See application file for complete search history.

(56) References Cited

U.S. PATENT DOCUMENTS

| | | | |
|---|---|---|---|
| 5,047,971 A * | 9/1991 | Horwitz | 703/14 |
| 5,373,457 A | 12/1994 | George et al. | |
| 5,535,370 A * | 7/1996 | Raman et al. | 703/15 |
| 5,857,164 A | 1/1999 | Wakita | |
| 6,102,960 A * | 8/2000 | Berman et al. | 703/17 |
| 6,615,394 B2 * | 9/2003 | Ogawa et al. | 716/5 |
| 6,721,922 B1 | 4/2004 | Walters et al. | |
| 6,789,237 B1 | 9/2004 | Ismail | |
| 6,794,674 B2 * | 9/2004 | Kusumoto | 257/E23.151 |
| 2001/0027386 A1 * | 10/2001 | Milsom | 703/14 |
| 2004/0049748 A1 * | 3/2004 | Croix | 716/4 |
| 2004/0049749 A1 * | 3/2004 | Croix | 716/4 |

OTHER PUBLICATIONS

Chen, "Path Sensitization In Critical Path Problem", IEEE Transactions On Computer Aided Design Of Integrated Circuits And Systems, vol. 12, No. 2, Feb. 1993, pp. 196-207.

(Continued)

*Primary Examiner*—Paul Dinh
*Assistant Examiner*—Suchin Parihar
(74) *Attorney, Agent, or Firm*—Lawrence J. Merkel; Meyertons, Hood, Kivlin, Kowert & Goetzel, P.c.

(57) ABSTRACT

A system for analyzing a circuit includes a computer. The computer operates on a model of the circuit. The model has an input, an output, and multiple controlled sources. The computer is configured to supply a stimulus to the input of the model of the circuit. The input stimulus has an associated value. Each of the multiple controlled sources has a current value derived from the input value. The computer is also configured to supply a stimulus to the output of the model. The output stimulus has an associated value. The computer is further configured to sweep the values for the input and output stimuli through a two sets of swept values, and to obtain an output current of the model of the circuit as a function of the swept values.

26 Claims, 6 Drawing Sheets

OTHER PUBLICATIONS

Dartu et al., "TETA: Transistor-Level Engine For Timing Analysis", 35th Design Automation Conference, 1998, 4 pgs.

Croix et al., "A Fast And Accurate Technique To Optimize Characterization Tables For Logic Synthesis", 34th Design Automation Conference, 1997, 4 pgs.

Dartu et al., "Calculating Worst-Case Gate Delays Due To Dominant Capacitance Coupling", 34th Design Automation Conference, 1997, 6 pgs.

Lam et al., "Exact Minimum Cycle Times For Finite State Machines", Proceedings Of The 31st IEEE/ACM Design Automation Conference, Jun. 1994, 6 pgs.

O'Brien et al., "Modeling The Driving-Point Characteristic Of Resistive Interconnect For Accurate Delay Estimation", IEEE, 1989, pp. 512-515.

Pillage et al., "Asymptotic Waveform Evaluation For Timing Analysis", IEEE Transactions On Computer Aided Design, vol. 9, No. 4, Apr. 1990, pp. 352-366.

Qian et al., "Modeling The "Effective Capacitance" For The RC Interconnect Of CMOS Gates", IEEE Transactions On Computer Aided Design Of Integrated Circuits And Systems, vol. 13, No. 12, Dec. 1994, pp. 1526-1535.

Ratzlaff et al., "RICE: Rapid Interconnect Circuit Evaluation Using AWE", IEEE Transactions On Computer Aided Design Of Integrated Circuits And Systems, vol. 13, No. 6, Jun. 1994, pp. 763-776.

Silveira et al., "Efficient Reduced-Order Modeling Of Frequency-Dependent Coupling Inductances Associated With 3-D Interconnect Structures", 32nd ACM/IEEE Design Automation Conference, 1995, 5 pgs.

Dartu et al., "A Gate-Delay Model For High-Speed CMOS Circuits", 31st ACM/IEEE Design Automation Conference, 1994, 5 pgs.

McDonald et al., "Computing Logic-Stage Delays Using Circuit Simulation And Symbolic Elmore Analysis", 38th ACM Design Automation Conference, 2001, pp. 283-288.

Sun et al., "Efficient Timing Analysis For CMOS Circuits Considering Data Dependent Delays", IEEE Transactions On Computer Aided Design Of Integrated Circuits And Systems, vol. 17, No. 6, Jun. 1998, pp. 546-552.

Dartu et al., "Performance Computation For Precharacterized CMOS Gates With RC Loads", IEEE Transactions On Computer Aided Design Of Integrated Circuits And Systems, vol. 15, No. 5, May 1996, pp. 544-553.

Chen et al., "A New Gate Delay Model For Simultaneous Switching And Its Application", 38th ACM Design Automation Conference, 2001, pp. 289-294.

Arunachalam et al., "CMOS Gate Delay Models For General RLC Loading", IEEE International Conference On Computer Design, VLSI In Computers And Processors, 1997, 6 pgs.

Yalcin et al, "Fast And Accurate Timing Characterization Using Functional Information", IEEE Transactions On Computer Aided Design Of Integrated Circuits And Systems, vol. 20, No. 2, Feb. 2001, pp. 315-331.

Shih et al., "ILLIADS: A Fast Timing And Reliability Simulator For Digital MOS Circuits", IEEE Transactions On Computer Aided Design Of Integrated Circuits And Systems, vol. 12, No. 9, Sep. 1993, pp. 1387-1402.

Ngoya et al., "Newton-Raphson Iteration Speed-Up Algorithm For The Solution Of Nonlinear Circuit Equations In General-Purpose CAD Programs", IEEE Transactions On Computer Aided Design Of Integrated Circuits And Systems, vol. 16, No. 6, Jun. 1997, pp. 638-644.

Acar et al., "TETA: Transistor-Level Waveform Evaluation For Timing Analysis", IEEE Transactions On Computer Aided Design Of Integrated Circuits And Systems, vol. 21, No. 5, May 2002, pp. 605-616.

Devgan et al., "Adaptively Controlled Explicit Simulation", IEEE Transactions On Computer Aided Design Of Integrated Circuits And Systems, vol. 13, No. 6, Jun. 1994, pp. 746-762.

Liu et al, "Ftd: An Exact Frequency To Time Domain Conversion For Reduced Order RLC Interconnect Models", 35th Design Automation Conference, 1998, 4 pgs.

Bracken et al., Interconnect Simulation With Asymptotic Waveform Evaluation (AWE), IEEE Transactions On Circuits And Systems-1: Fundamental Theory And Applications, vol. 39, No. 11, Nov. 1992, pp. 869-878.

Odabasioglu et al., "PRIMA: Passive Reduced-Order Interconnect Macromodeling Algorithm", IEEE, 1997, 8 pgs.

Alpert et al., "RC Delay Metrics For Performance Optimization", IEEE Transactions On Computer Aided Design Of Integrated Circuits And Systems, vol. 20, No. 5, May 2001, pp. 571-582.

Ratzlaff et al., "Modeling The RC-Interconnect Effects In A Hierarchical Timing Analyzer", IEEE Custom Integrated Circuits Conference, 1992, 4 pgs.

Raghavan et al., "A New Nonlinear Driver Model For Interconnect Analysis", 28th ACM/IEEE Design Automation Conference, 1991, pp. 561-566.

Kashyap et al., "An "Effective" Capacitance Based Delay Metric For RC Interconnect", IEEE, 2000, pp. 229-234.

Kahng et al., "An Analytical Delay Model For RLC Interconnects", IEEE Transactions On Computer Aided Design Of Integrated Circuits And Systems, vol. 16, No. 12, Dec. 1997, pp. 1507-1514.

Kam et al., "EDA Challenges Facing Future Microprocessor Design", IEEE Transactions On Computer Aided Design Of Integrated Circuits And Systems, vol. 19, No. 12, Dec. 2000, pp. 1498-1506.

Hitchcock et al., "Timing Analysis Of Computer Hardware", IBM J. Res. Develop., vol. 26, No. 1, Jan. 1982, pp. 100-105.

Darringer et al., "EDA In IBM: Past, Present, And Future", IEEE Transactions On Computer Aided Design Of Integrated Circuits And Systems, vol. 19, No. 12, Dec. 2000, pp. 1476-1497.

Kobayashi et al., "Delay Abstraction In Combinational Logic Circuits", IEEE Transactions On Computer Aided Design Of Integrated Circuits And Systems, vol. 16, No. 10, Oct. 1997, pp. 1205-1212.

Chatzigeorgiou et al., "A Modeling Technique For CMOS Gates", IEEE Transactions On Computer Aided Design Of Integrated Circuits And Systems, vol. 18, No. 5, May 1999, pp. 557-575.

Hirata et al., "Proposal Of A Timing Model For CMOS Logic Gates Driving A CRC π Load", ACM Conference, 1998, pp. 537-544.

Jen et al., "A Compact And Unified MOS DC Current Model With Highly Continuous Conductances For Low-Voltage IC's", IEEE Transactions On Computer Aided Design Of Integrated Circuits And Systems, vol. 17, No. 2, Feb. 1998, pp. 169-172.

Hafed et al., "Delay And Current Estimation In A CMOS Inverter With An RC Load", IEEE Transactions On Computer Aided Design Of Integrated Circuits And Systems, vol. 20, No. 1, Jan. 2001, pp. 80-89.

Korshak et al., "An Effective Current Source Cell Model For VDSM Delay Calculation", IEEE, 2001, pp. 296-300.

Keller et al., "A Robust Cell-Level Crosstalk Delay Change Analysis", ACM/IEEE International Workshop On Timing Issues In The Specification And Synthesis Of Digital Systems, Feb. 2004, 9 pgs.

Rubinstein et al., "Signal Delay In RC Tree Networks", IEEE Transactions On CAD, vol. 2, No. 3, 1983, pp. 202-211.

Cormen et al., "Introduction To Algorithms", McGraw-Hill, Inc., 1990, pp. 762-765.

Kong et al., "Digital Timing Macromodeling For VLSI Design Verification", Kluwer Academic Publishers, 1995, pp. 1-8.

Croix et al., "Blade And Razor: Cell And Interconnect Delay Analysis Using Current-Based Models", Design Automation Conference, Jun. 2003, 4 pgs.

Elmore, "The Transient Response Of Damped Linear Networks With Particular Regard To Wideband Amplifiers", Journal Of Applied Physics, vol. 19, Jan. 1948, pp. 55-63.

Matson et al., "Macromodeling And Optimization Of Digital MOS VLSI Circuits", IEEE Transactions On Computer-Aided Design, vol. CAD-5, No. 4, Oct. 1986, pp. 659-678.

Monachino, "Design Verification System For Large-Scale LSI Designs", IEEE 19th Design Automation Conference, 1982, pp. 83-90.

Synopsys, Inc., Library Compiler Reference Manual, vol. 2, Reb. 3.3b, Appendix D, 1999, pp. 1-102.

Ousterhout, "A Switch-Level Timing Verifier For Digital MOS VLSI", IEEE Transactions On Computer-Aided Design, vol. CAD-4, No. 3, Jul. 1985, pp. 336-349.

Chawla et al., "MOTIS-An MOS Timing Simulator", IEEE Transactions On Circuits And Systems, vol. CAS-22, No. 12, Dec. 1975, pp. 901-910.

Kundert, "Sparse Matrix Techniques", Circuit Analysis, Simulation And Design, Advances In CAD For VLSI, vol. 3, Part 1, 1986, 45 pgs.

Maron, "Methods For Finding Roots of f(x)", Numerical Analysis: A Practical Approach, Sec. 2.2, 1982, pp. 53-57.

Microcode, "Circuitmaker 2000—The Virtual Electronics Lab, Quit tour—Simulation and Analyses", http://www.microcode.com/products/sim.htm, Microcode 2000, pp. 1-7.

Press et al., "Numerical Recipes In C: The Art Of Scientific Computing", Cambridge University Press, Second Edition 1993, pp. 123-128.

McCalla, "Fundamentals Of Computer-Aided Circuit Simulation", Kluwer Academic Publishers, 1988, pp. 107-112.

Ho et al., "The Modified Nodal Approach To Network Analysis", IEEE Transactions On Circuits And Systems, vol. CAS-22, No. 6, Jun. 1975, pp. 504-509.

Horowitz et al., "Dynamic Programming", Fundamentals Of Computer Algorithms, 1978, pp. 198-203.

Pillage et al., "Electronic Circuit And System Simulation Methods", Linear Transient Analysis, 1995, 41 pgs.

* cited by examiner

APPARATUS AND METHODS FOR CELL MODELS FOR TIMING AND POWER ANALYSIS

CROSS-REFERENCE TO RELATED APPLICATIONS

This application claims priority to U.S. Provisional Patent Application Ser. No. 60/466,295, titled "Apparatus And Methods For Cell Models For Timing And Power Analysis," filed on Apr. 29, 2003. Furthermore, the present application is a continuation-in-part of U.S. patent application Ser. No. 10/465,518 filed on Jun. 19, 2003, which claims priority to U.S. Provisional Patent Application Ser. No. 60/389,997 filed on Jun. 19, 2002. The present application incorporates by reference the above patent applications.

TECHNICAL FIELD

The inventive concepts relate generally to analysis of electronic circuits and, more particularly, to apparatus and methods for power and timing analysis of cells in electronic circuitry.

BACKGROUND

Electronic circuitry, such as circuits embodied in integrated circuits (ICs) continue to increase in the number of circuits or cells and, hence, in their overall complexity. The increased complexity of the circuits continues to pose challenges for circuit designers that typically analyze or simulate the circuit before its physical realization in an IC. Furthermore, the circuit complexity has increased while design cycles have typically remained unchanged or have become shorter.

To meet those challenges, circuit designers increasingly rely on Electronic Design Automation (EDA) tools (sometimes known as Computer-Aided Design (CAD) tools) to analyze and simulate their designs before physical implementation of the design in an IC. EDA tools provide a way of analyzing the circuit's behavior and making any desired modifications or enhancements before arriving a final design.

The analysis and design process, however, tends to have an iterative nature, and hence can consume relatively large amounts of time. To meet the challenges posed by more complex design and shorter design cycles, designers seek EDA tools with improved accuracy and efficiency.

SUMMARY

The inventive techniques provide improved models for analysis of electronic circuits. One aspect of the invention relates to apparatus for analyzing electronic circuitry. In one embodiment, a system for analyzing a circuit includes a computer. The computer operates on a model of the circuit. The model has an input, an output, and multiple controlled sources. The computer is configured to supply a stimulus to the input of the model of the circuit. The input stimulus has an associated value. Each of the multiple controlled sources has a current value derived from the input value. The computer is also configured to supply a stimulus to the output of the model. The output stimulus has an associated value. The computer is further configured to sweep the values for the input and output stimuli through a two sets of swept values, and to obtain an output current of the model of the circuit as a function of the swept values.

Another aspect of the invention relates to a computer program product that includes a computer application adapted for processing by a computer. The application causes the computer to operate on a model of the circuit. The model has an input, an output, and multiple controlled sources. The application causes the computer to supply a stimulus to the input of the model of the circuit. The input stimulus has an associated value. Each of the multiple controlled sources has a current value derived from the input value. The application also causes the computer to supply a stimulus to the output of the model. The output stimulus has an associated value. The application further causes the computer to sweep the values for the input and output stimuli through a two sets of swept values, and to obtain an output current of the model of the circuit as a function of the swept values.

Yet another aspect of the invention relates to methods of analyzing a circuit by using a model that has an input, an output, and multiple controlled sources. The method includes supplying a stimulus, with one value, to the input of the model, and supplying another stimulus, with another value, to an output of the model. Each of the multiple controlled sources in the model has an associated current value derived from the input value. The method also includes sweeping the values for the two stimuli through respective sets of swept values, and obtaining the output current of the model as a function of the swept values.

BRIEF DESCRIPTION OF THE DRAWINGS

The appended drawings illustrate only exemplary embodiments of the invention and therefore should not be considered as limiting its scope. Persons of ordinary skill in the art who have the benefit of the description of the invention appreciate that the disclosed inventive concepts lend themselves to other equally effective embodiments. In the drawings, the same numeral designators used in more than one drawing denote the same, similar, or equivalent functionality, components, or blocks.

DETAILED DESCRIPTION

The disclosed concepts contemplate apparatus and associated methods for analysis of electronic circuitry, such as power and timing analysis of cells in electronic circuitry. The disclosed concepts help to provide EDA tools with relatively high accuracy and efficiency.

U.S. Provisional Patent Application Ser. No. 60/466,295, referenced above, describes two cell models. The first cell model includes one controlled current source (a voltage-controlled current-source (VCCS)), in other words, a single-current-source cell model. The second cell model includes more than one controlled current source (more than one VCCS), or a multiple-current-source cell model.

As persons skilled in the art who have the benefit of the description of the invention understand, one may use multiple-current-source cell models to calculate timing and power characteristics for a desired cell. Specifically, given a voltage stimulus on an input pin and an arbitrary load on an output pin (capacitive, interconnect, etc., as the model works for any arbitrary load), this model can be used to determine the voltage response at the output pin as well as the current flow through the cell (from power supplies) with near-SPICE (a common circuit analysis CAD tool) accuracy (within 1%–2% typically). With the current flow, input voltage, and output voltages known, complete timing and power characteristics for the cell can be determined, as desired.

Unique to the disclosed multiple-current-source cell models are their ability to accurately calculate the output voltage using arbitrary input voltages, including noisy voltage waveforms that do not exhibit monotonicity. Furthermore, unlike other cell models, this model can drive arbitrary loads (resistors, capacitors, etc.) as well as reduced-order loads (for example, interconnect preprocessed down to poles and residues). This model also calculates power consumption of the cell. Finally, both timing and power values can be calculated even when the power and ground voltages supplied to the cell differ from the values that cell characterization was performed at. Because the cell can be used in a different environment than the one in which it was characterized, the model can be used to accurately model IR-drop.

The inventive cell models described herein exhibit several advantages and improvements over other approaches and models:

The multiple-current-source cell models can calculate the power consumption of a cell by collecting information while performing timing analysis.

The multiple-current-source cell models can calculate timing and power numbers for a cell when the reference voltages (power and ground) of the cell being analyzed are not the same voltages used during cell characterization (this phenomenon is known in the art as IR-drop).

The multiple-current-source cell models according to the invention may execute many times (e.g., thousands of times) faster than HSPICE (the industry standard SPICE). While these speeds are comparable with the models disclosed in U.S. Provisional Patent Application Ser. No. 60/466,295, referenced above, they are at least one order of magnitude faster than other existing transient models.

The inventive multiple-current-source cell models can calculate timing and power consumption simultaneously.

Error margins of the multiple-current-source cell models are substantially better than other non-SPICE models (typically within 1% to 2% of SPICE).

The inventive multiple-current-source cell models can consume or use arbitrary voltage waveforms. Most other models use a simple line segment (or maybe two segments) to represent the input voltage. The inventive multiple-current-source cell models, however, can consume or use input voltage descriptions consisting of many points (e.g., hundreds or thousands of points), as desired. The output may constitute a voltage waveform consisting of many points, not just a few.

The multiple-current-source cell models can accurately calculate both timing and power, even when the Vss and Vdd values that the cell is at do not match the values used during characterization.

Though exemplary embodiments of the inventive multiple-current-source cell models apply to CMOS circuits, the cell models can be used for other circuit types, as desired and as persons of ordinary skill in the art who have the benefit of the description of the invention understand. Examples include circuits that have just N-type or just P-type logic (for example, domino logic). Other examples include other transistor types (like silicon-on-insulator or SOI).

The cell models' noise immunity filter is the same as the noise immunity filter for single-current-source cell models, as disclosed in U.S. Provisional Patent Application Ser. No. 60/466,295, referenced above. This filter provides a model of the intrinsic noise immunity of a cell which would otherwise not be modeled correctly.

The multiple-current-source cell models (and the single-current-source cell models) can be created for more than just a single input pin switching. CAD tools typically characterize a single input pin switching. However, the inventive multiple-current-source cell models (and the single-current-source cell models) are not limited to a single input pin switching.

Both multiple-current-source cell models and single-current-source cell models can drive an arbitrary load, as desired. For example, the load may constitute a simple capacitor, a resistive-capacitive (RC)/resistive-capacitive-inductive (RCL) tree or mesh, a complex topology, or some reduced form (like poles and residues). If a SPICE transistor model of the gate can drive the load, so can the multiple-current-source cell models (and the single-current-source cell models).

Other known current models (for a gate, not a transistor) set the current flow as a function of the input voltage. The multiple-current-source cell models and single-current-source cell models, however, can create a multi-dimensional voltage-controlled current source.

The multiple-current-source cell models can account for multiple power supplies (beyond just Vss and Vdd).

The multiple-current-source cell models use a single voltage-controlled voltage source to represent all N-type transistors in a single stage and another to represent all P-type transistors in a single stage. Some other methods replace individual transistors with current sources.

Some other models use an inverter to test their results, so it is hard to determine the viability of the models. The multiple-current-source cell models and single-current-source cell models can run complex gates (like OR gates and XOR gates) with many (e.g., hundreds) of parasitically extracted elements to determine their viability.

Both multiple-current-source cell models and single-current-source cell models are relatively simple to characterize for and to calibrate. They are simpler, for example, than voltage-based models originated by Synopsys, Inc., a well-known provider of EDA tools. Characterization also occurs much more quickly and requires fewer computing resources (both computers and simulation engine licenses, such as SPICE licenses).

The description of exemplary embodiments of the inventive multiple-current-source cell models refer to CMOS circuits. This reference, however, should not be viewed as a limitation. As persons of ordinary skill in the art who have the benefit of the description of the invention understand, one may apply the inventive concepts to other circuit types, as desired.

Furthermore, the description assumes that substrate voltage is at Vdd or Vss. One may easily extend the multiple-current-source cell models to account for variations in substrate voltage, as desired, and as persons of ordinary skill in the art who have the benefit of the description of the invention understand.

A model according to exemplary embodiments of the multiple-current-source consists of the following components:

A voltage-controlled current source to represent the current flow through CMOS N-type transistors;
A voltage-controlled current source to represent the current flow through CMOS P-type transistors;
An internal capacitor ($C_{internal}$); and
A time-shift element.

To account for signal integrity, the model may also include a noise immunity filter (implemented as a simple RC filter that preprocesses the input voltage or as a resistance between the internal capacitor and the load placed on the output pin), as desired. An embodiment of a model is shown in FIG. 1 below (without the noise immunity filter and the time shift).

Figure 1:
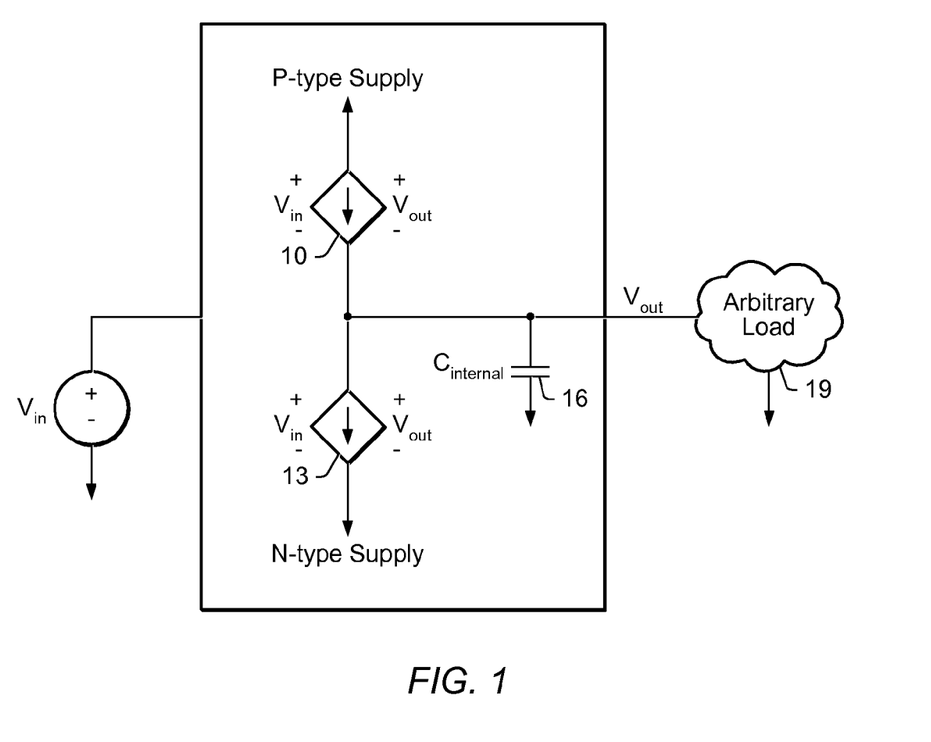
FIG. 1 shows a cell model according to an exemplary embodiment of the invention.

The embodiment in FIG. 1 for cell model 5 includes VCCS 10, VCCS 15, and internal capacitor ($C_{internal}$) 16. Output of cell model 5 drives an arbitrary load 19. Voltage source Vin represents the voltage applied to the input of cell model 5. Voltage source Vout represents the voltage applied to the output of cell model 5.

The following describes extraction of model parameters. The extraction of the model parameters is accomplished as follows:

Extraction of data to represent the voltage-controlled current sources;
Determination of internal capacitance and time shift; and
Determination of noise immunity filter values.

The process of calculating the voltage-controlled current source values is relatively straight forward. Given an arbitrary cell with input pin A and output pin Y, one performs the following:

Attach a DC voltage supply to pin A (called Vin);
Attach a DC voltage supply to pin Y (called Vout);
Any other input pin settings should be set to Vdd or Vss so as to obtain the desired result between pin A and Y. For example, an AND gate with the additional input pin B might be set with B at Vdd so that transitions on A cause Y to transition. However, for power calculations, a setting of B at Vss might also be relevant;
Attach appropriate power and ground supplies to the cell (commonly known as Vdd and Vss, respectively);
Sweep values of Vin and Vout independently (in a DC simulation of the circuit). For example, measuring 16 values of Vin and 16 of Vout results in 256 different combinations of Vin and Vout. Measure current flow through the power and ground supplies (Vss and Vdd) during the sweeps. If more than 1 power supply or 1 ground supply exist, measure these too. The result should be two (or more) 2-D table of current flow for the power and ground supplies as a function of Vin and Vout values; and
Keep the data as a table or fit to an equation, as desired. The form used for the voltage-controlled current source is not critical, and one may use alternative forms, as desired, and as persons of ordinary skill in the art who have the benefit of the description of the invention understand. Once done, the measured current represents the current flow through the N-type and P-type transistors as a function of Vin and Vout.

As persons of ordinary skill in the art who have the benefit of the description of the invention understand, a single model is valid from one input pin to one output pin. So, for a 2-input NAND gate with input pins A and B and output pin Y, two models would be produced. One would represent the A-to-Y path and the other the B-to-Y path. Of course, a different (yet equally valid) approach would be to sweep Vin for A, Vin for B, and Vout for Y independently and have only a single model. Most simulators constrain themselves to a single pin switching at once, but the inventive models described here are not constrained to a single input switching.

In a similar manner, two models for hidden power can be created: one to represent the A-to-Y path, and the second to represent the B-to-Y path. As hidden power represents power consumption by the cell for which a transition on the input does not cause an output transition, the A-to-Y path model could be determined by sweeping Vin for A, setting the voltage on pin B to Vss, and setting the voltage on pin Y to Vdd. For example, with respect to a 2-input NAND gate, the resulting model can produce a one-dimension table dependent solely on a single input voltage. A table of two dimensions can be produced by simultaneously sweeping the voltages on pins A and Y. Such a model can be useful in signal integrity analysis, in which a voltage glitch is observed on the output signal even though the cell itself never transitions the output.

Figure 2:
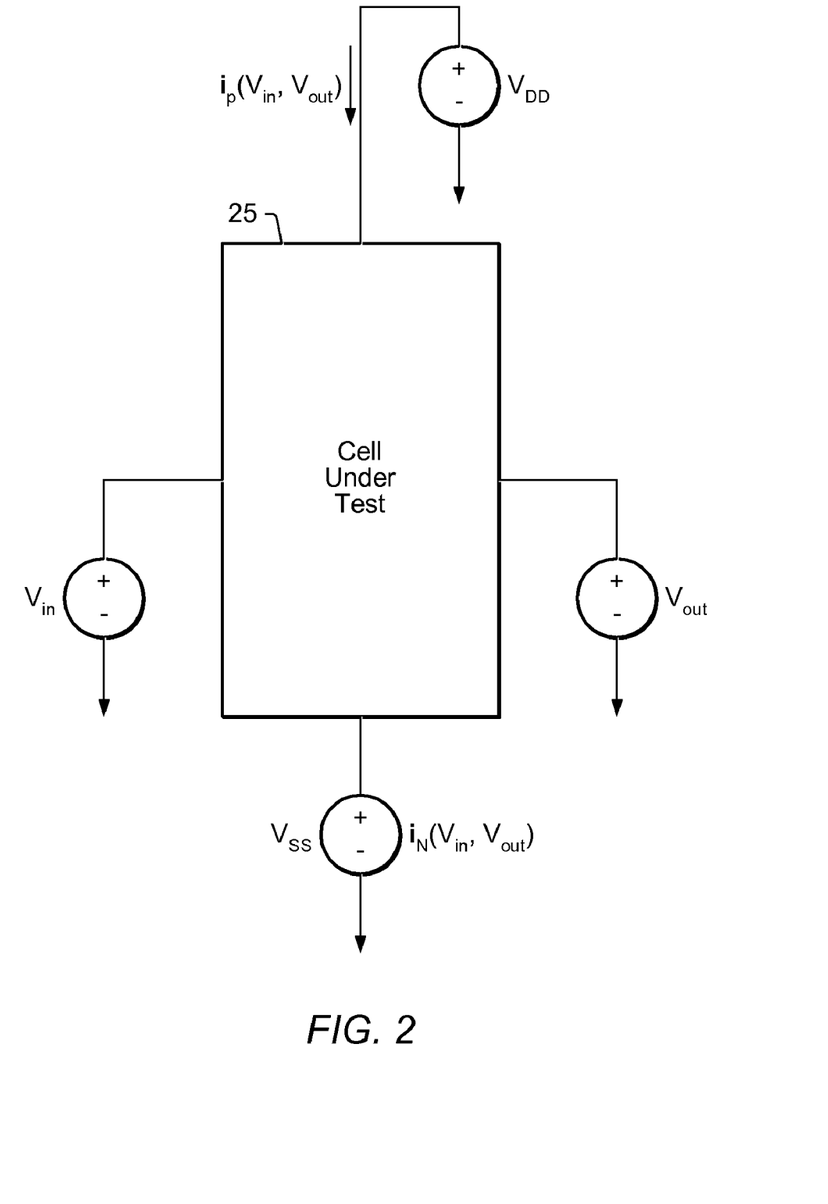
FIG. 2 illustrates current measurement of a cell under test for creating cell models according to an illustrative embodiment of the invention.

FIG. 2 illustrates measuring current flow through the N-type ($i_N$) and P-type ($i_P$) transistors as part of the process described above. Voltage sourced labeled as Vdd and Vss provide power to cell 25 (power supply sources). Voltage source Vin provides a voltage applied to the input of cell 25. Similarly, voltage source Vout represents a voltage applied to the output of cell 25. Note that these values are functions of Vin and Vout. If multiple pins are switching, these would be a function of more input voltages.

The process described above works for a single-stage logic function (like a NAND gate). If more than one stage exists in the logic function, each individual stage is analyzed separately, as persons of ordinary skill in the art who have the benefit of the description of the invention understand.

Figure 3:
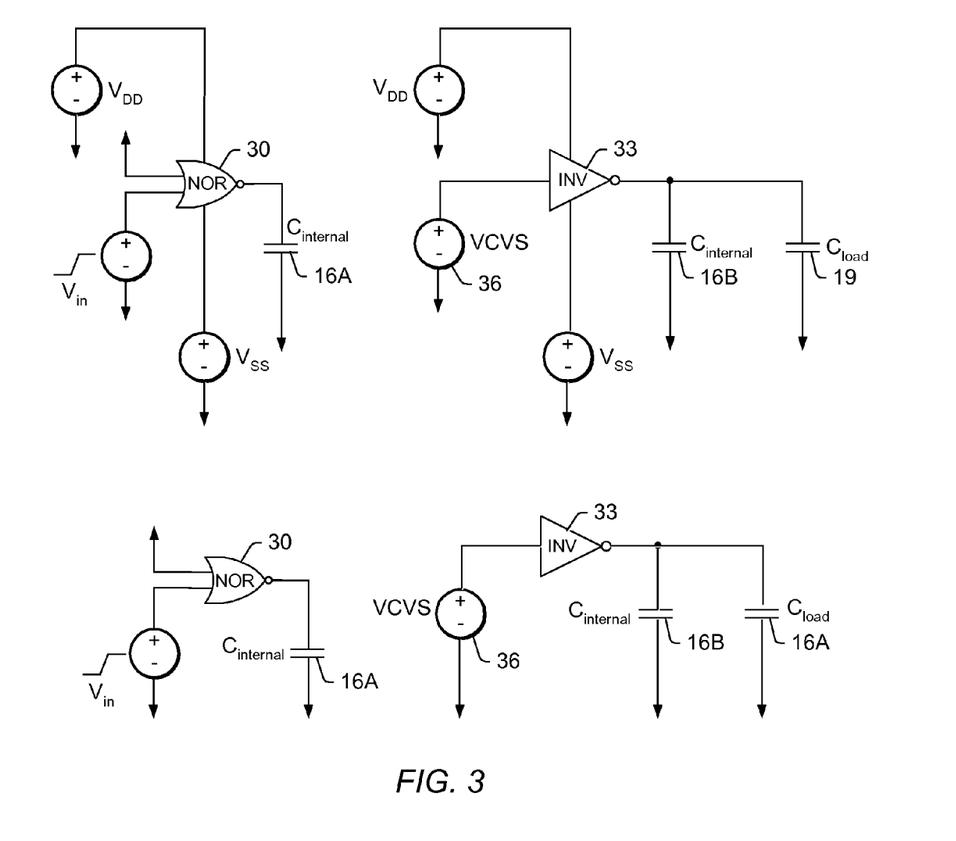
FIG. 3 depicts creation of an illustrative multi-stage cell models according to an exemplary embodiment of the invention.

FIG. 3 below relates to creation of models for multiple-stage cells. In order to create a model for a two-stage cell (like the OR gate shown), the two individual gates that make up the OR gate are independently created and calibrated. To evaluate the OR gate, the model engine calculates the response of the NOR gate 30 (represented by voltage controlled voltage source (VCVS) 36 and passes this voltage to the inverter to determine the final gate response (represented by the voltage-controlled voltage source or VCVS). This occurs within the model's evaluation engine.

For a larger gate consisting of many stages, only the final gate(s) (driving the outputs) needs a model, though it is certainly possible to create individual models for all single-stage gate components, as desired, as persons of ordinary skill in the art who have the benefit of the description of the invention understand.

In a multi-stage cell, the first stage is calibrated differently from the above procedure. In the simulation program (e.g., SPICE) used for the cell characterization of the model, the first stage is loaded with the second stage (while the second stage is loaded with a capacitor). The first stage model according to the invention is then created by matching the output of the model to the first stage using the normal procedure described herein. A time shift is not needed in this step because the time step can be added to the time step in the second stage. The second stage is modeled normally as described herein.

The reason for the difference in a multi-stage model is that the load is fixed for all stages except for those stages driving output pins. For example, consider an OR gate (such as the OR gate shown in FIG. 3) consisting of a NOR stage driving an inverter (INV). The NOR stage does not drive anything other than the INV. However, the INV stage should be able to drive any load placed on the output of the cell. Thus, to calibrate the NOR stage, one loads it with the INV stage (during the simulation program portion of calibration), not with a capacitor. Note that the INV stage should be loaded with some reasonable capacitive load. From the simulation program run, one may determine an internal capacitor with which to load the NOR stage model. One need not calculate a time shift.

Next, one calibrates the INV stage model. For this calibration, one may use the same simulation program run used to calibrate the NOR stage. In other words, one may use a single simulation program run in which one loads the OR gate with a capacitor and extracts output voltage waveforms at the output of the NOR stage and the INV stage simultaneously. For the INV stage, one performs the normal internal capacitance calculation. However, the time shift calculated should be the time shift that would calibrate the OR gate to the combination NOR and INV stages in the model.

In large macros consisting of many stages, one models the output stage for arbitrary loads. All internal stages have fixed loads (i.e., other internal stages). Thus, for larger models, one may focus on the output stage. In other words, as the size of the logic block grows, the shape of the input waveform tends to have less and less of an impact on the output waveform shape, thus limiting the impact to that of a time shift consideration.

After the DC current flow has been extracted, a calibration step occurs in which the internal capacitance and time shift is determined. To calibrate in exemplary embodiments, the cell is run through a simulation program, like SPICE, in which the input pin and output pin transition (the same pins for which one creates the model according to the invention). In other words, a voltage swing is placed on the input pin and the output pin is loaded with a simple capacitance. Reasonable input transition times and cap loads should be used in this transient SPICE run for the technology being used. The two waveforms (at input pin A and output pin Y) should be saved in a desired form.

Next, one exercises the model with the two derived current sources and searches for an internal capacitance value such that the output waveform created by the model matches in shape the waveform extracted through the simulation program (e.g., SPICE) using the same input waveform. One may determine a match by examining the standard deviation between the two waveforms. When the standard deviation is minimized, an acceptable value for internal capacitance has been found. If it is impractical to look at all points of the two waveforms, one may compare to one another sets of points in the transitioning part of the waveforms. Persons of ordinary skill in the art who have the benefit of the description of the invention appreciate that using standard deviations constitutes merely one technique for determining a match between two waveforms and that one may use techniques, as desired.

Once the waveforms match, the distance between the two waveforms determines the time shift. Note that a single transient run and calibration is sufficient to calibrate the model for all (non-noisy) inputs and output loads.

Figure 4:
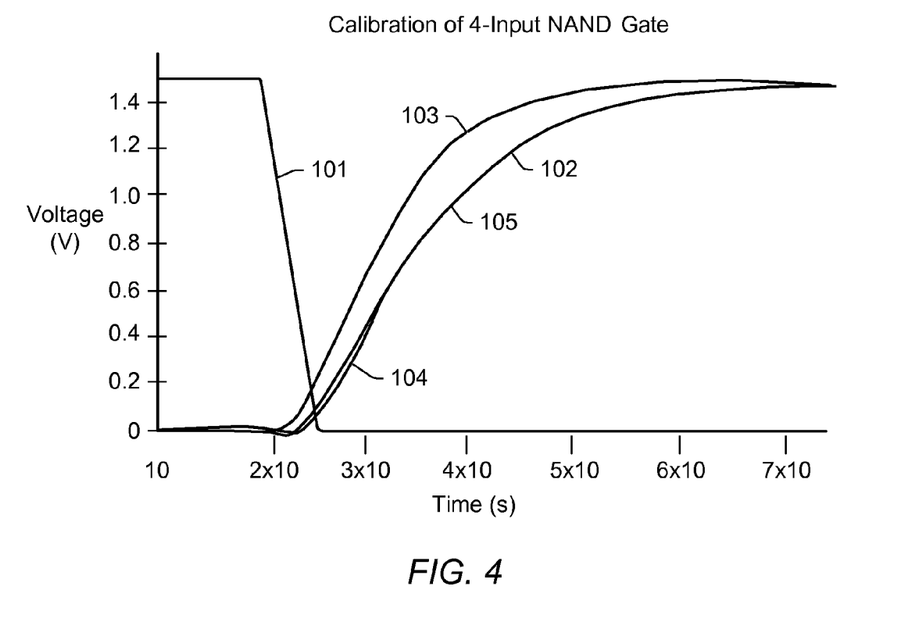
FIG. 4 shows waveforms obtained through calibration in an exemplary embodiment according to the invention.

FIG. 4 shows waveforms obtained through calibration in an exemplary embodiment according to the invention. FIG. 4 provides plots for ramp input 01, HSPICE output 102, uncalibrated model output 103, $C_{internal}$-adjusted model output 104, and final model output 105. In this example, a minimal time shift results in a match between the waveforms.

Once the basic model has been constructed, the noise immunity filter values are determined. To do this, one first creates a noisy input signal (one that would be reasonable for the design and technology, as persons of ordinary skill in the art who have the benefit of the description of the invention understand). In order to calculate a valid noise immunity filter, the noisy input signal should produce some noise at the output pin (if the cell is capable of exhibiting noise). An appropriate waveform accurately represents the intrinsic noise immunity of the cell. This noisy waveform is used as input (e.g., on pin A) in a simulation program (e.g., SPICE) run to see some noisy output (e.g., on pin Y).

Next, one applies this noisy input to an RC filter and uses that voltage (across the capacitor) to feed the model according to the invention. One increases or decreases the RC time constant until the model output matches the data from the simulation program run. Note that one may in some cases alter the time shift to account for delays associated with the noise immunity filter, as persons of ordinary skill in the art who have the benefit of the description of the invention understand.

Since this is a single RC filter, one can alter the RC time constant and then decide how to represent this constant as independent R and C values. In other words, as persons of ordinary skill in the art who have the benefit of the description of the invention understand, two simple RC filters are equivalent if the RC products match, even if the two R and two C values do not match one another.

Once the noise immunity filter has been calibrated, one recalculates the time shift. The presence of the noise immunity filter acts as a delay element, so one should alter the time shift accordingly.

The same type of trial-and-error approach may be used to calculate a resistance value if the noise immunity filter is attached between the internal capacitor and the load.

Figure 5:
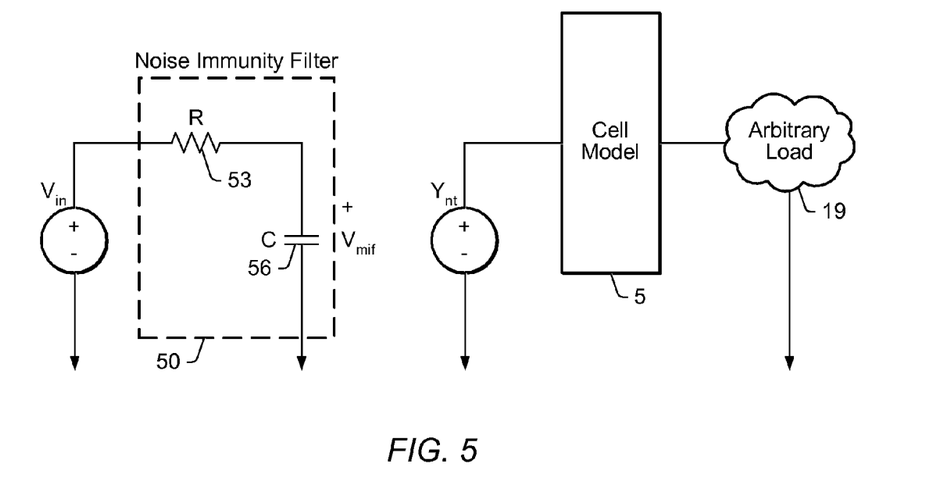
FIG. 5 shows a noise immunity filter as a simple resistive-capacitive (RC) filter that preprocesses the voltage prior to evaluation by a model according to an illustrative embodiment of the invention.

FIG. 5 shows a noise immunity filter 50 as a simple RC filter that preprocesses the voltage prior to evaluation by the model according to the invention. In the exemplary embodiment shown, noise immunity filter 50 includes resistor 53 (labeled as R) and capacitor 56 (labeled as C). The voltage across the capacitor in the noise immunity filter (represented as Vnif) may be used to drive the model according to the invention.

One may easily perform evaluation of models according to exemplary embodiments of the invention. The calibration step involves model evaluation using various internal cap values (excluding the time shift). Given a load to be driven at the output pin and a voltage waveform at the input pin, the model performs the following steps:

Based on the input voltage (Vin) at a given time point and an estimated voltage on the output (Vout), one determines the current provided by the N-type current supply. Note that, unlike traditional voltage-controlled current sources, this supply uses two voltages to determine the current flow (if the model according to the invention is created for two input pins switching simultaneously, it would be three voltages);

Perform the same step for the P-type current supply;

Sum the two currents to determine the cumulative current that drives the output;

One then applies this current to the arbitrary load and internal capacitance to determine the calculated voltage at the output (Vout);

If the Vout guess in the first two steps matches the calculated Vout in the last step (by some given or desired tolerance), an output voltage has been established for that time point. Otherwise, one iterates back to the first step using a new guess for Vout. Nonlinear solvers (like secant iteration) can may used to refine the guesses for Vout until convergence is achieved, as persons of ordinary skill in the art who have the benefit of the description of the invention understand; and One records Vout and increment to the next time point.

After the output voltage (Vout) has been determined for the time period that Vin was applied, one shifts Vout in time by the time shift associated with the model.

The presence of a noise immunity filter impacts this process in one of two ways, depending upon the form of the filter:

If the filter consists of a simple RC circuit that preprocesses Vin, one drives the filter with the input voltage (Vin) to determine the voltage at the capacitor of the noise immunity filter. One uses this new voltage waveform as input to the model.

If the filter consists of a resistor between Cinternal and the load being driven, one simply includes the resistor in the calculation of Vout in the algorithm described above.

One may perform power analysis in models according to the invention as one performs timing analysis. In order to calculate the current flow to the output pin, the current flow to and from Vss and Vdd are calculated. The sum of these flows determines the current that drives the load. These two current flows also determine the power consumed by the cell during a transition.

As persons of ordinary skill in the art who have the benefit of the description of the invention understand, current flow through a transistor depends on relative voltages. For a fixed substrate voltage, when one sweeps Vout and Vin (with Vdd held constant for the P-type transistors), one may make the resulting table a function of the relative voltages, instead of absolute voltages. Put differently, when one uses models the model in a different environment, one may calculate relative voltages and map them to the original model under which one performed characterization.

Further, as persons of ordinary skill in the art who have the benefit of the description of the invention understand, one may implement the inventive multiple-current-source cell models and the single-current-source cell models using one or more computer(s) to provide a computer-implemented characterization/modeling tool.

Figure 6:
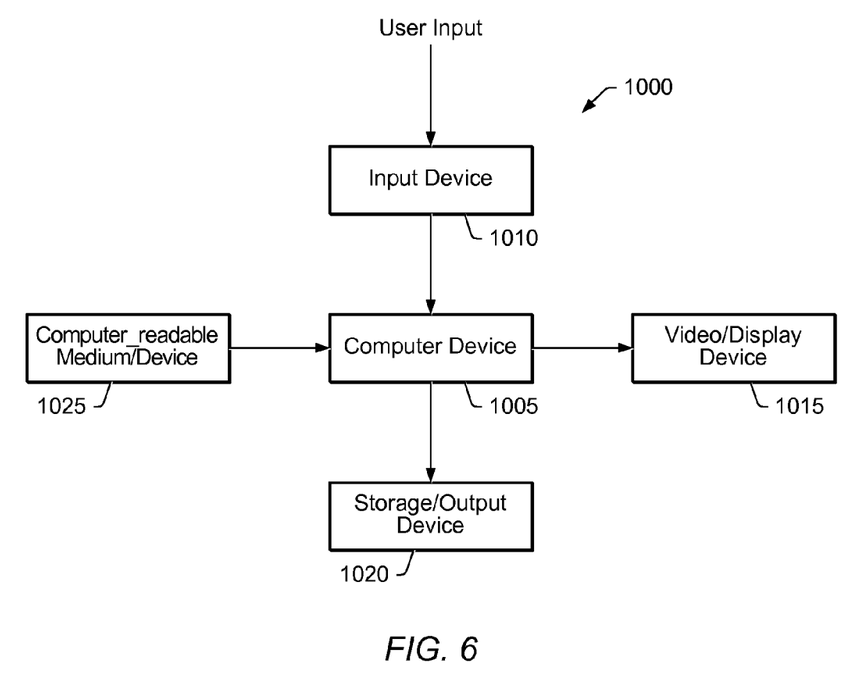
FIG. 6 shows a block diagram an exemplary embodiment of a computer system for implementing cell models according to the invention.

FIG. 6 shows a block diagram of an exemplary embodiment of a computer system 1000 for implementing cell models according to the invention. a block diagram of a system 1000 for processing information according to the invention. The system 1000 includes a computer device 1005, an input device 1010, a video/display device 1015, and a storage/output device 1020, although one may include more than one of each of those devices, as desired.

The computer device 1005 couples to the input device 1010, the video/display device 1015, and the storage/output device 1020. The system 1000 may include more that one computer device 1005, for example, a set of associated computer devices or systems, as desired.

The system 1000 operates in association with input from a user. The user input typically causes the system 1000 to perform specific desired information-processing tasks, including circuit characterization and/or circuit simulation. The system 1000 in part uses the computer device 1005 to perform those tasks. The computer device 1005 includes an information-processing circuitry, such as a central-processing unit (CPU), although one may use more than one CPU or information-processing circuitry, as persons skilled in the art would understand.

The input device 1010 receives input from the user and makes that input available to the computer device 1005 for processing. The user input may include data, instructions, or both, as desired. The input device 1010 may constitute an alphanumeric input device (e.g., a keyboard), a pointing device (e.g., a mouse, roller-ball, light pen, touch-sensitive apparatus, for example, a touch-sensitive display, or tablet), or both. The user operates the alphanumeric keyboard to provide text, such as ASCII characters, to the computer device 1005. Similarly, the user operates the pointing device to provide cursor position or control information to the computer device 1005.

The video/display device 1015 displays visual images to the user. The visual images may include information about the operation of the computer device 1005, such as graphs, pictures, images, and text. The video/display device may constitute a computer monitor or display, a projection device, and the like, as persons of ordinary skill in the art would understand. If a system uses a touch-sensitive display, the display may also operate to provide user input to the computer device 1005.

The storage/output device 1020 allows the computer device 1005 to store information for additional processing or later retrieval (e.g., softcopy), to present information in various forms (e.g., hardcopy), or both. As an example, the storage/output device 1020 may constitute a magnetic, optical, or magneto-optical drive capable of storing information on a desired medium and in a desired format. As another example, the storage/output device 1020 may constitute a printer, plotter, or other output device to generate printed or plotted expressions of the information from the computer device 1005.

The computer-readable medium 1025 interrelates structurally and functionally to the computer device 1005. The computer-readable medium 1025 stores, encodes, records, and/or embodies functional descriptive material. By way of illustration, the functional descriptive material may include computer programs, computer code, computer applications, and/or information structures (e.g., data structures or file systems). When stored, encoded, recorded, and/or embodied by the computer-readable medium 1025, the functional descriptive material imparts functionality. The functional descriptive material interrelates to the computer-readable medium 1025.

Information structures within the functional descriptive material define structural and functional interrelations between the information structures and the computer-readable medium 1025 and/or other aspects of the system 1000. These interrelations permit the realization of the information structures' functionality. Moreover, within such functional descriptive material, computer programs define structural and functional interrelations between the computer programs and the computer-readable medium 1025 and other aspects of the system 1000. These interrelations permit the realization of the computer programs' functionality.

By way of illustration, the computer device 1005 reads, accesses, or copies functional descriptive material into a computer memory (not shown explicitly in the figure) of the computer device 1005. The computer device 1005 performs operations in response to the material present in the computer memory. The computer device 1005 may perform the operations of processing a computer application that causes the computer device 1005 to perform additional operations.

Accordingly, the functional descriptive material exhibits a functional interrelation with the way the computer device 1005 executes processes and performs operations.

Furthermore, the computer-readable medium 1025 constitutes an apparatus from which the computer device 1005 may access computer information, programs, code, and/or applications. The computer device 1005 may process the information, programs, code, and/or applications that cause the computer device 1005 to perform additional operations.

Note that one may implement the computer-readable medium 1025 in a variety of ways, as persons of ordinary skill in the art would understand. For example, memory within the computer device 1005 may constitute a computer-readable medium 1025, as desired. Alternatively, the computer-readable medium 1025 may include a set of associated, interrelated, or networked computer-readable media, for example, when the computer device 1005 receives the functional descriptive material from a network of computer devices or information-processing systems. Note that the computer device 1005 may receive the functional descriptive material from the computer-readable medium 1025, the network, or both, as desired.

As persons of ordinary skill in the art who have the benefit of the description of the invention understand, one may modify or vary the apparatus or techniques according to the invention in a variety of ways without departing from the scope of the invention. Some of those modifications or alternatives are described below.

For instance, one may use alternative components for one or more of the components of models according to the invention. For example, rather than using current source(s), one may use voltage-controlled resistor(s). Such a model may make it easier to perform IR-drop analysis because the source-to-drain resistance is relatively constant for a given voltage drop across the source and drain, regardless of the reference voltage.

For more complex logic, one may model the output cell using models according to the invention and use a simple time shift for the rest of the logic. In other words, for logic consisting of many stages, the entire macro need not be modeled by individual models. One may model just those elements that drive output signals of the model.

Although the inventive techniques are described for a single input pin to a single output pin in a gate, more complex descriptions can be created to represent multiple inputs and/or multiple outputs, as desired. The voltage-controlled current source would then be an equation or table that uses more than just Vin and Vout to determine the current flow. Calibration would then consider the other input pins.

A simple (additive) time shift accurately calculates the cell's response. However, always using the noise immunity filter (even when the input voltage is not noisy) may eliminate a need for this time shift. Furthermore, the presence of the noise immunity filter will alter the time shift value.

Model according to the invention are valid even if the output voltage does not make a transition. This aspect may be a consideration for power consumption analysis of cells.

One may implement the voltage-controlled current source as either equation-based or table-based. The model works as long as the voltage-controlled current sources can accurately calculate current flow, independent of the form.

As persons of ordinary skill in the art who have the benefit of the description of the invention understand, one may convert the multiple-current-source cell models to single-current-source cell models, as desired. More specifically, one may do so once the reference ground and power voltages have been determined. In such a situation, one performs power analysis as a post-processing step.

In the event that the substrate voltage also varies from Vss and Vdd (depending on the transistor type), the DC sweeps used to create the voltage-controlled current sources for the multiple-current-source cell models may be extended to include variations of this voltage. Obviously, the equations used to calculate current flow should include these effects, but the transformation falls within the knowledge of persons of ordinary skill in the art who have the benefit of the description of the invention.

The current flow as described for exemplary embodiments of the invention is measured in a simulation program (e.g., SPICE) run, using DC analysis. It is also possible to extract these currents while performing transient analysis. The manner in which these values are calculated, or, for that matter, that the models according to the invention are calibrated, is independent of the model itself and should not be construed as a limitation on the model.

Rather than using secant iteration in models according to the invention (to solve the nonlinear system), one may use other non-linear solvers, as desired. Use of secant should not be viewed as a limitation but, rather, an implementation choice.

Rather than using the noise immunity filter to handle the inherent noise immunity exhibited by certain cells, one may use other techniques, as persons of ordinary skill in the art who have the benefit of the description of the invention understand.

Note that one may extend the single-current-source cell models to account for power in a cell. Those models store current information about the output pin and not to/from Vss and Vdd. These currents could be measured at the same time the current flow is measured, and appropriate tables may be generated.

After the single-current-source timing has been calculated, the Vin and Vout values are known and can be used to perform direct lookups for Vss and Vdd current flows. In other words, the multiple-current-source cell models can calculate power intrinsically, whereas the single-current-source cell models may calculate timing and then post process Vss and Vdd currents to determine power. Additionally, IR-drop could be accounted for within the single-current-source cell models by appropriately sweeping Vss and Vdd values during the DC analysis stage.

Referring to the figures, the various blocks shown depict mainly the conceptual functions and signal flow. The actual implementation may or may not contain separately identifiable elements for the various functional blocks. For example, one may combine the functionality of various blocks into one block, as desired. Furthermore, one may realize the functionality of a single block in several blocks, as desired. The choice of implementation depends on various factors, such as particular design and performance specifications for a given implementation, as persons of ordinary skill in the art who have the benefit of the description of the invention understand.

Other modifications and alternative embodiments of the invention in addition to those described here will be apparent to persons of ordinary skill in the art who have the benefit of the description of the invention. Accordingly, this description teaches those skilled in the art the manner of carrying out the invention and are to be construed as illustrative only. As persons of ordinary skill in the art with the benefit of the description of the invention understand, one may make many modifications to the circuit arrangements described here and shown in the accompanying figures, as desired, without departing from the inventive concepts.

For example, one may modify and generalize the apparatus, methods, and concepts to accommodate other sizes of the various variables, such as input sizes, output sizes, number of inputs, outputs, and signals, and the like. The modifications depend on the design and performance specifications for a particular implementation and, as noted, fall within the knowledge of persons skilled in the art who have the benefit of the description of the invention.

Furthermore, persons skilled in the art may make various changes in the shape, size and arrangement of parts without departing from the scope of the invention described in this document. For example, persons skilled in the art may substitute equivalent elements for the elements illustrated and described here. Moreover, persons skilled in the art who have the benefit of this description of the invention may use certain features of the invention independently of the use of other features, without departing from the scope of the invention.

I claim:

1. A system for modeling a circuit represented by a first model comprising at least one input, at least one output, at least one voltage supply connection, and at least one ground connection, wherein the system comprises a computer configured to:
perform a direct-current (DC) simulation of the first model;
during the DC simulation, perform a DC sweep of a first stimulus on the input over a first range of DC values;
during the DC simulation, perform a DC sweep of a second stimulus on the output over a second range of DC values;
determine a first measured current on the voltage supply connection as a function of the first range and the second range;
determine a second measured current on the ground connection as a function of the first range and the second range; and
generate a second model of the circuit, the second model comprising a first current source that models a first current responsive to the first measured current and a second current source that models a second current responsive to the second measured current wherein the second model, when simulated, determines timing and power characteristics of the circuit.

2. The system as recited in claim 1 wherein determining the first measured current as a function of the first range and the second range comprises populating a first table of currents measured during the simulation for each value in the first range and the second range, and wherein determining the second measured current as a function of the first range and the second range comprises populating a second table of currents measured during the simulation for each value in the first range and the second range.

3. The system as recited in claim 1 wherein the second model models an output current on the output of the circuit as a sum of the first current and the second current.

4. The system as recited in claim 1 wherein the computer is further configured to model a power consumption of the circuit during a simulation of the second model using the first current and the second current.

5. The system as recited in claim 1 wherein the computer is further configured to:
perform a second DC simulation of the first model;
during the second DC simulation, perform a DC sweep of a third stimulus on the input over a third range of DC values;
determine a third measured current on the voltage supply connection as a function of the third range;
determine a fourth measured current on the ground connection as a function of the third range; and
generate a third model of the circuit, the third model comprising a third current source that models a third current responsive to the third measured current and a fourth current source that models a fourth current responsive to the fourth measured current.

6. The system as recited in claim 5 wherein the computer is further configured to model a power consumption of the circuit during a simulation of the third model using the third current and the fourth current, the power consumption representing power consumed if the output of the circuit does not transition in response to the input.

7. The system as recited in claim 1 wherein the first current source comprises a voltage controlled current source that generates the first current of the second model responsive to an input voltage on an input of the second model and an output voltage on an output of the second model, and wherein the second current source comprises a voltage controlled current source that generates the second current of the second model responsive to the input voltage on the input of the second model and the output voltage on the output of the second model.

8. The system as recited in claim 1 wherein the first current represents current through P-type transistors in the circuit, and wherein the second current represents current through N-type transistors in the circuit.

9. A computer readable medium storing a plurality of instructions which, when executed:
perform a direct-current (DC) simulation of the a first model representing a circuit, the first model comprising at least one input, at least one output, at least one voltage supply connection, and at least one ground connection;
during the DC simulation, perform a DC sweep of a first stimulus on the input over a first range of DC values;
during the DC simulation, perform a DC sweep of a second stimulus on the output over a second range of DC values;
determine a first measured current on the voltage supply connection as a function of the first range and the second range;
determine a second measured current on the ground connection as a function of the first range and the second range; and
generate a second model of the circuit, the second model comprising a first current source that models a first current responsive to the first measured current and a second current source that models a second current responsive to the second measured current wherein the second model, when simulated, determines timing and power characteristics of the circuit.

10. The computer readable medium as recited in claim 9 wherein the plurality of instructions which, when executed, determine the first measured current as a function of the first range and the second range comprise instructions which, when executed, populate a first table of currents measured during the simulation for each value in the first range and the second range, and wherein the plurality of instructions which, when executed, determine the second measured current as a function of the first range and the second range comprise instructions which, when executed, populate a second table of currents measured during the simulation for each value in the first range and the second range.

11. The computer readable medium as recited in claim 9 wherein the second model models an output current on the output of the circuit as a sum of the first current and the second current.

12. The computer readable medium as recited in claim 9 wherein the plurality of instructions, when executed, model a power consumption of the circuit during a simulation of the second model using the first current and the second current.

13. The computer readable medium as recited in claim 9 wherein the plurality of instructions, when executed:
perform a second DC simulation of the first model;
during the second DC simulation, perform a DC sweep of a third stimulus on the input over a third range of DC values;
determine a third measured current on the voltage supply connection as a function of the third range;
determine a fourth measured current on the ground connection as a function of the third range; and
generate a third model of the circuit, the third model comprising a third current source that models a third current responsive to the third measured current and a fourth current source that models a fourth current responsive to the fourth measured current.

14. The computer readable medium as recited in claim 13 wherein the plurality of instructions, when executed, model a power consumption of the circuit during a simulation of the third model using the third current and the fourth current, the power consumption representing power consumed if the output of the circuit does not transition in response to the input.

15. The computer readable medium as recited in claim 9 wherein the first current source comprises a voltage controlled current source that generates the first current of the second model responsive to an input voltage on an input of the second model and an output voltage on an output of the second model, and wherein the second current source comprises a voltage controlled current source that generates the second current of the second model responsive to the input voltage on the input of the second model and the output voltage on the output of the second model.

16. The computer readable medium as recited in claim 9 wherein the plurality of instructions, when executed:
during the DC simulation, perform a DC sweep of a third stimulus on a second input of the circuit over a third range of DC values; and
wherein the determinations of the first measured current and the second measured current are further a function of the third range of DC values.

17. The computer readable medium as recited in claim 9 wherein the first current represents current through P-type transistors in the circuit, and wherein the second current represents current through N-type transistors in the circuit.

18. A method for modeling a circuit represented by a first model comprising at least one input, at least one output, at least one voltage supply connection, and at least one ground connection, the method comprising:
performing a direct-current (DC) simulation of the first model;
during the DC simulation, performing a DC sweep of a first stimulus on the input over a first range of DC values;
during the DC simulation, performing a DC sweep of a second stimulus on the output over a second range of DC values;
determining a first measured current on the voltage supply connection as a function of the first range and the second range;
determining a second measured current on the ground connection as a function of the first range and the second range; and
generating a second model of the circuit, the second model comprising a first current source that models a first current responsive to the first measured current and a second current source that models a second current responsive to the second measured current wherein the second model, when simulated, determines timing and power characteristics of the circuit.

19. The method as recited in claim 18 wherein determining the first measured current as a function of the first range and the second range comprises populating a first table of currents measured during the simulation for each value in the first range and the second range, and wherein determining the second measured current as a function of the first range and the second range comprises populating a second table of currents measured during the simulation for each value in the first range and the second range.

20. The method as recited in claim 18 wherein the second model models an output current on the output of the circuit as a sum of the first current and the second current.

21. The method as recited in claim 18 further comprising modeling a power consumption of the circuit during a simulation of the second model using the first current and the second current.

22. The method as recited in claim 18 further comprising:
performing a second DC simulation of the first model;
during the second DC simulation, performing a DC sweep of a third stimulus on the input over a third range of DC values;
determining a third measured current on the voltage supply connection as a function of the third range;
determining a fourth measured current on the ground connection as a function of the third range; and
generating a third model of the circuit, the third model comprising a third current source that models a third current responsive to the third measured current and a fourth current source that models a fourth current responsive to the fourth measured current.

23. The method as recited in claim 22 further comprising modeling a power consumption of the circuit during a simulation of the third model using the third current and the fourth current, the power consumption representing power consumed if the output of the circuit does not transition in response to the input.

24. The method as recited in claim 18 wherein the first current source comprises a voltage controlled current source that generates the first current of the second model responsive to an input voltage on an input of the second model and an output voltage on an output of the second model, and wherein the second current source comprises a voltage controlled current source that generates the second current of the second model responsive to the input voltage on the input of the second model and the output voltage on the output of the second model.

25. The method as recited in claim 18 further comprising:
during the DC simulation, performing a DC sweep of a third stimulus on a second input of the circuit over a third range of DC values; and
wherein the determinations of the first measured current and the second measured current are further a function of the third range of DC values.

26. The method as recited in claim 18 wherein the first current represents current through P-type transistors in the circuit, and wherein the second current represents current through N-type transistors in the circuit.

* * * * *